US008231695B2

(12) United States Patent
Cunningham et al.

(10) Patent No.: US 8,231,695 B2
(45) Date of Patent: Jul. 31, 2012

(54) FUEL COMPOSITIONS COMPRISING HYDROCARBON OIL CARRIERS AND METHODS FOR USING THE SAME

(75) Inventors: Lawrence J. Cunningham, Mechanicsville, VA (US); Beth A. Sloane, Mechanicsville, VA (US); Dennis J. Malfer, Glen Allen, VA (US); May Duffield Thomas, Richmond, VA (US)

(73) Assignee: Afton Chemical Corporation, Richmond, VA (US)

( * ) Notice: Subject to any disclaimer, the term of this patent is extended or adjusted under 35 U.S.C. 154(b) by 494 days.

(21) Appl. No.: 11/463,490

(22) Filed: Aug. 9, 2006

(65) Prior Publication Data

US 2008/0034647 A1 Feb. 14, 2008

(51) Int. Cl.
*C10L 1/22* (2006.01)
*C10L 1/16* (2006.01)

(52) U.S. Cl. .................................. 44/433; 44/415
(58) Field of Classification Search .............. 44/415, 44/433
See application file for complete search history.

(56) References Cited

U.S. PATENT DOCUMENTS

| | | | |
|---|---|---|---|
| 5,514,190 A * | 5/1996 | Cunningham et al. | 44/415 |
| 5,634,951 A | 6/1997 | Colucci et al. | |
| 5,697,988 A | 12/1997 | Malfer et al. | |
| 5,725,612 A | 3/1998 | Malfer et al. | |
| 5,876,468 A | 3/1999 | Moreton | |
| 5,944,858 A * | 8/1999 | Wallace | 44/359 |
| 5,997,593 A | 12/1999 | McDonnell et al. | |
| 6,048,373 A * | 4/2000 | Malfer et al. | 44/415 |

| | | | |
|---|---|---|---|
| 2003/0140552 A1 | 7/2003 | Schwahn et al. | |
| 2005/0241216 A1 | 11/2005 | Clark et al. | |
| 2007/0245621 A1 * | 10/2007 | Malfer et al. | 44/415 |

FOREIGN PATENT DOCUMENTS

| | | |
|---|---|---|
| CN | 1167136 A | 12/1997 |
| CN | 1245208 A | 2/2000 |
| CN | 1775921 A | 5/2006 |
| DE | 102 56 161 | 6/2004 |
| EP | 0 905 217 A1 | 3/1999 |
| EP | 1 081 209 A1 | 3/2001 |
| WO | WO01/42399 | 6/2001 |
| WO | WO0142399 * | 6/2001 |
| WO | WO03078553 * | 9/2003 |
| WO | WO03/091364 | 11/2003 |
| WO | WO03091364 * | 11/2003 |
| WO | WO2007/048553 | 5/2007 |

OTHER PUBLICATIONS

State Intellectual Property Office of the Peoples Republic of China, First Office Action for Chinese Patent Application No. 200710005119.8 dated Jan. 8, 2010, 3 pages.
European Patent Office Communication of a Notice of Opposition dated Nov. 24, 2009 and Notice of Opposition to European Patent EP 1 250 404 B1 by Lubrizol Limited, 225 pages.
Allen A. Aradi et al., "The Effect of Fuel Composition and Engine Operating Parameters on Injector Deposits in a High-Pressure Direct Injection Gasoline (DIG) Research Engine," The Society of Automotive Engineers, Inc. Technical Paper 1999-01-3690, 1999, 11 pages.

* cited by examiner

*Primary Examiner* — Michael Marcheschi
*Assistant Examiner* — Chantel Graham
(74) *Attorney, Agent, or Firm* — Fitch, Even, Tabin & Flannery, LLP; Dennis H. Rainear

(57) ABSTRACT

The use of fuel compositions comprising selected hydrocarbon oils as carriers for detergents has been found to reduce deposit formation as well as prolong the functionality of fuel injectors. The selection and utilization of particularly characterized hydrocarbon oils as detergent carriers reduces intake valve deposits and combustion chamber deposits, in comparison to conventionally used carrier fluids.

13 Claims, No Drawings

FUEL COMPOSITIONS COMPRISING HYDROCARBON OIL CARRIERS AND METHODS FOR USING THE SAME

FIELD OF THE INVENTION

The presently claimed invention relates to compositions comprising particularly refined hydrocarbon oils and oils derived from processes such as gas to liquid (GTL) methods, as carriers for detergents in fuels. As such, the presently claimed invention is directed toward these compositions and their uses, as well as systems and methods of utilizing these hydrocarbon oils to reduce or eliminate fuel injector, valve, and combustion chamber deposits. More particularly, the invention relates to fuel compositions comprising a fuel, a hydrocarbon oil, and a detergent, and the uses of said fuel compositions in various internal combustion assemblies.

BACKGROUND OF THE INVENTION

It has been widely known that utilizing a substance known as a carrier improves the performance of a detergent added to a fuel composition. The role of the detergent is to reduce the formation of intake valve deposits and injector deposits in internal combustion engines, as well as reduce or minimize the formation of deposits in the combustion chamber or actually remove existing deposits.

To enhance their ability to prevent or remove deposits, detergents have conventionally been added to fuels in conjunction with petroleum-based or synthetic carrier fluids. Petroleum-based carrier fluids include naphthenic and paraffinic base stock oils, and conventional synthetic fluids include low molecular weight polypropylenes, polyisobutylenes, poly-alpha olefins, esters, polyols, and polyalkyleneoxides. In recent years, the use of mineral oils as carriers has been reduced or eliminated due to their contributions to combustion chamber deposits.

While incorporating detergents and carriers in fuels has been effective in reducing intake valve deposits, in some instances, it can lead to an increase in combustion chamber deposits and/or valve sticking. It has been postulated that the carrier itself contributes to the formation of deposits, leading to strategies that minimize their use. Additionally, commonly used synthetic carriers are expensive, making it even more desirable to minimize their use. In the prior art (e.g., U.S. Pat. No. 6,800,103), solvent extracted and hydrotreated mineral oils have been proposed as alternatives to synthetic carriers; however, they have been targeted to have lower viscosity indexes to improve deposit control performance. Other prior art (e.g., U.S. Pat. No. 6,840,970) teaches the use of mineral oils and polyether carriers, but identifies mineral oils that are significantly more viscous than those of the presently claimed invention, and claims even higher viscosities as inherent in practicing that art. Based on the disclosures and teachings in the prior art, it is very unexpected that lower viscosity and high viscosity index hydrocarbon oils would demonstrate any benefit over previously utilized mineral oils.

Therein, a more effective and less costly carrier for fuel detergents would be a desirable contribution to the art.

SUMMARY OF THE INVENTION

In an embodiment, the presently claimed invention is directed to a fuel composition comprising a detergent and a particular type of mineral oil or gas to liquid (GTL) oil, hereinafter referred to as a "hydrocarbon oil." In an embodiment, hydrocarbon oils of the presently claimed invention may be characterized as having a viscosity of about 200 cSt or less at 40° C., greater than about 75% saturates, having pour points less than about 0° C., and sulfur levels less than about 50 ppm. In an additional embodiment, the hydrocarbon oils utilized as carriers in the presently claimed invention have been chemically modified in the presence of hydrogen, wherein the molecules have been hydrocracked, are very low in sulfur content, and are highly isomerized.

In a further embodiment, a hydrocarbon oil utilized as a carrier in the presently claimed invention may be further characterized by features such as:

| | |
|---|---|
| Knoack Volatility, wt % | ≦50 |
| Pour Point | ≦0° C. |
| Viscosity (20° C.) | ≦250 cSt |
| Viscosity (40° C.) | ≦200 cSt |
| Viscosity (100° C.) | ≦25 cSt |
| Saturated Hydrocarbons | >75% |
| Sulfur | ≦50 ppm |

In an embodiment, a fuel composition is presented comprising fuel, a hydrocarbon oil having a viscosity at 40° C. of about 200 cSt or less, and a detergent. In another embodiment, a fuel additive is contemplated comprising a hydrocarbon oil having a pour point less than about 0° C., and a detergent. In alternative embodiments, methods are contemplated for preparing a fuel composition and a fuel additive are presented, comprising the steps of blending a hydrocarbon oil containing at least about 75% saturates with at least one detergent. An additional embodiment relates to a fuel additive product prepared by the process of combining a hydrocarbon oil having a sulfur content of less than about 50 ppm with a detergent.

Further embodiments include methods for reducing deposit formation in an engine, and methods for optimizing the performance of fuel injectors, comprising the steps of supplying a formulation comprising a hydrocarbon oil and detergent to an engine and/or fuel injectors.

DETAILED DESCRIPTION OF THE INVENTION

In an embodiment, the presently claimed invention presents a fuel composition comprising a fuel, a detergent, and hydrocarbon oil. The hydrocarbon oil may be characterized as being a liquid at room temperature or less, and having a viscosity at 40° C. of about 200 cSt or less, greater than about 75% saturates with sulfur levels less than about 50 ppm. In addition, the hydrocarbon oils contemplated as carriers in the present invention have been chemically modified in the presence of hydrogen, wherein the molecules have been hydrocracked, are very low in sulfur content, and are highly isomerized.

In a further embodiment, a hydrocarbon oil utilized as a carrier in the presently claimed invention may be characterized by features such as:

| | |
|---|---|
| Knoack Volatility, wt % | ≦50 |
| Pour Points | ≦0° C. |
| Viscosity (20° C.) | ≦250 cSt |
| Viscosity (40° C.) | ≦200 cSt |
| Viscosity (100°) | ≦25 cSt |
| Saturated Hydrocarbon | >75% |
| Sulfur | ≦50 ppm |

In an embodiment of the presently claimed invention, a detergent is combined with a hydrocarbon oil utilized as a carrier fluid, forming an additive or additive concentrate for use in fuel. In this embodiment, the carrier fluid is hydrocarbon oil having the following characteristics: a viscosity at 40° C. less than or equal to about 200 cSt, and greater than about 75% saturates. In a preferred embodiment, the hydrocarbon oil may have a viscosity at 40° C. of less than about 150 cSt, and in a more preferred embodiment, a viscosity at 40° C. less than about 100 cSt.

In another embodiment, the carrier fluid for the detergent is a hydrocarbon oil having a viscosity less than or equal to about 200 cSt (at 40° C.) and greater than about 90% saturates, utilized alone, or in combination with one or more ancillary carrier fluids.

In an embodiment, a method for reducing deposit formation in an engine is presented comprising the steps of supplying a fuel containing an additive composition comprising a hydrocarbon oil as characterized herein and at least one detergent to an engine, wherein the rate of deposit formation is reduced relative to deposit formation using a fuel that does not contain an additive composition comprising hydrocarbon oil as characterized herein. In an additional embodiment, a method of reducing or removing intake valve deposits comprises the steps of supplying a fuel containing an additive composition comprising a hydrocarbon oil, as characterized herein, and at least one detergent to an engine, wherein the rate of intake valve deposit formation is reduced relative to deposit formation using a fuel that does not contain an additive composition comprising a hydrocarbon oil as characterized herein.

In an additional embodiment, an engine is contemplated that is supplied with fuel compositions comprising a fuel, a hydrocarbon oil, and a detergent. In a further embodiment, the fuel compositions of the presently claimed invention may be utilized in various internal combustion assemblies. By "combustion assemblies" herein is meant, for example, and not by limitation: Atkinson cycle engines; rotary engines; spray guided, wall guided, and combined wall/spray guided direct injection gasoline (DIG) engines; turbocharged DIG engines; supercharged DIG engines; homogeneous combustion DIG engines; homogeneous/stratified DIG engines; DIG engines outfitted with piezoinjectors with the capability of multiple fuel pulses per injection; DIG engines with EGR; DIG engines with a lean-NOx trap; DIG engines with a lean-NOx catalyst; DIG engines with SN-CR NOx control; DIG engines with exhaust diesel fuel after-injection (post combustion) for NOx control; DIG engines outfitted for flex fuel operation (i.e. gasoline, ethanol, methanol, biofuels, synthetic fuels, natural gas, liquefied petroleum gas (LPG), and mixtures thereof); conventional and advanced port-fueled gasoline engines with and without advanced exhaust aftertreatment systems capability, with and without turbochargers, with and without superchargers, with combined supercharger/turbocharger, with and without on-board capability to deliver additive for combustion and emissions improvements, with and without variable valve timing; gasoline fueled homogeneous charge compression ignition (HCCI) engines; diesel HCCI engines; gasoline HCCI-electric hybrid engines; diesel HCCI-electric hybrid engines; diesel-electric hybrid vehicles; gasoline-electric hybrid vehicles; two-stroke engines; diesel fuel engines; automotive diesel engines; gasoline fuel engines; stationary generators; gasoline and diesel HCCI, supercharged, turbocharged, gasoline and diesel direct injection engines; engines capably of variable valve timing; leanburn engines; engines capable of inactivating cylinders; or any other internal combustion engine, and the like.

Ancillary Carriers

As previously mentioned, one or more ancillary carriers (or co-carriers) of various types may be utilized in an embodiment of the presently claimed invention, including but not limited to one or more liquid poly-alpha-olefin oligomers, liquid poly(oxyalkylene) compounds, liquid alcohols and/or polyols, polyalkenes, polyethers, liquid esters, less-refined mineral oils, and mixtures thereof. Liquid carriers may also include one or more polyalkyl-substituted hydroxyaromatic compounds. Less-refined mineral oil ancillary carriers that may be utilized in an embodiment include paraffinic, naphthenic and asphaltic oils, derived from various petroleum crude oils and processed in any suitable manner, used alone or in combination with any other suitable co-carrier.

Poly-alpha-olefins (PAO) are utilized in an embodiment as ancillary carrier fluids, and include hydrotreated and unhydrotreated poly-alpha-olefin oligomers, i.e., hydrogenated or unhydrogenated products, primarily trimers, tetramers and pentamers of alpha-olefin monomers, which monomers contain from about 6 to about 12, generally about 8 to about 12 and most preferably about 10 carbon atoms. Their synthesis is outlined in *Hydrocarbon Processing* February 1982, p. 75 et seq.; and in U.S. Pat. Nos. 3,763,244; 3,780,128; 4,172,855; 4,218,330; and 4,950,822. The conventional process essentially comprises catalytic oligomerization of short chain linear alpha olefins (suitably obtained by catalytic treatment of ethylene). In an embodiment, these ancillary poly-alpha-olefin carriers will generally have a viscosity (at 100° C.) in the range of about 2 to about 20 centistokes (cSt). Preferably, the poly-alpha-olefin has a viscosity of at least about 8 cSt, and most preferably about 10 cSt, at 100° C.

The poly (oxyalkylene) compounds which are suitable for use as ancillary carriers are fuel-soluble compounds that can be represented by the following formula:

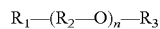

$R_1-(R_2-O)_n-R_3$ wherein $R_1$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, $R_2$ is an alkylene group having 2-10 carbon atoms (preferably 2-4 carbon atoms), $R_3$ is typically a hydrogen, alkoxy, cycloalkoxy, hydroxy, amino, hydrocarbyl (e.g., alkyl, cycloalkyl, aryl, alkylaryl, aralkyl, etc.), amino-substituted hydrocarbyl, or hydroxy-substituted hydrocarbyl group, and n is an integer from 1 to 500 and preferably in the range of from 3 to 120 representing the number (usually an average number) of repeating alkyleneoxy groups. In compounds having multiple —$R_2$—O— groups, $R_2$ can be the same or different alkylene group and where different, can be arranged randomly or in blocks. Preferred poly (oxyalkylene) compounds are monools comprised of repeating units formed by reacting an alcohol with one or more alkylene oxides, preferably one alkylene oxide.

The average molecular weight of the poly (oxyalkylene) compounds used as carrier fluids is preferably in the range of from about 500 to about 3000, more preferably from about 750 to about 2500, and most preferably from above about 1000 to about 2000.

One useful sub-group of poly (oxyalkylene) compounds is comprised of the hydrocarbyl-terminated poly(oxyalkylene) monools such as are referred to in the passage at column 6, line 20 to column 7 line 14 of U.S. Pat. No. 4,877,416 and references cited in that passage, said passage and said references being fully incorporated herein by reference.

A preferred sub-group of poly (oxyalkylene) compounds is comprised of one or a mixture of alkylpoly (oxyalkylene)

monools which in its undiluted state is a gasoline-soluble liquid having a viscosity of at least about 70 centistokes (cSt) at 40° C. and at least about 13 cSt at 100° C. Of these compounds, monools formed by propoxylation of one or a mixture of alkanols having at least about 8 carbon atoms, and more preferably in the range of about 10 to about 18 carbon atoms, are particularly preferred.

The poly (oxyalkylene) carriers used in the practice of this invention preferably have viscosities in their undiluted state of at least about 60 cSt at 40° C. (more preferably at least about 70 cSt at 40° C.) and at least about 11 cSt at 100° C. (more preferably at least about 13 cSt at 100° C.). In addition, the poly (oxyalkylene) compounds used in the practice of this invention preferably have viscosities in their undiluted state of no more than about 400 cSt at 40° C. and no more than about 50 cSt at 100° C. More preferably, their viscosities will not exceed about 300 cSt at 40° C. and will not exceed about 40 cSt at 100° C.

Preferred poly (oxyalkylene) compounds also include poly (oxyalkylene) glycol compounds and mono ether derivatives thereof that satisfy the above viscosity requirements and that are comprised of repeating units formed by reacting an alcohol or polyalcohol with an alkylene oxide, such as propylene oxide and/or butylene oxide with or without use of ethylene oxide, and especially products in which at least about 80 mole % of the oxyalkylene groups in the molecule are derived from 1,2-propylene oxide. Details concerning preparation of such poly(oxyalkylene) compounds are referred to, for example, in Kirk-Othmer, *Encyclopedia of Chemical Technology*, Third Edition, Volume 18, pages 633-645 (Copyright 1982 by John Wiley & Sons), and in references cited therein, the foregoing excerpt of the Kirk-Othmer encyclopedia and the references cited therein being incorporated herein in toto by reference. U.S. Pat. Nos. 2,425,755; 2,425,845; 2,448,664; and 2,457,139 also describe such procedures, and are fully incorporated herein by reference.

The poly (oxyalkylene) compounds, when used, pursuant to this invention will contain a sufficient number of branched oxyalkylene units (e.g., methyldimethyleneoxy units and/or ethyldimethyleneoxy units) to render the poly (oxyalkylene) compound gasoline soluble.

Suitable poly (oxyalkylene) compounds for use in the present invention include those taught in U.S. Pat. Nos. 5,514,190; 5,634,951; 5,697,988; 5,725,612; 5,814,111 and 5,873,917, the disclosures of which are incorporated herein by reference.

The polyalkenes suitable for use in the present invention include polypropene and polybutene. The polyalkenes of the present invention preferably have a molecular weight distribution (Mw/Mn) of less than about 4. In a preferred embodiment, the polyalkenes have a molecular weight distribution of about 1.4 or below. Preferred polybutenes have a number average molecular weight (Mn) of from about 500 to about 2000, preferably about 600 to about 1000, as determined by gel permeation chromatography (GPC). Suitable polyalkenes for use in the present invention are taught in U.S. Pat. No. 6,048,373, which descriptions are incorporated herein by reference. These poly alkanes may be normal polyalkanes or alkanes having a major portion of their double bonds in the alpha or beta position.

The polyalkyl-substituted hydroxyaromatic compounds suitable for use in the present invention include compounds known in the art, including those taught in U.S. Pat. Nos. 3,849,085; 4,231,759; 4,238,628; 5,300,701; 5,755,835 and 5,873,917, the disclosures of which are incorporated herein by reference.

Detergents

In some cases, a detergent can be synthesized in the carrier fluid. In other instances, the preformed detergent is blended with a suitable amount of the carrier fluid. If desired, the detergent can be formed in a suitable carrier fluid and then blended with an additional quantity of the same or a different carrier fluid.

In an embodiment, the contribution of the mineral oil characterized herein as a proportion of the total volume of carrier fluid may range from about 0.01 wt % to about 100 wt % of the total volume of carrier fluid, and the total contribution of one or more ancillary carrier fluids may range from about 0 wt % to about 99.99 wt % of the total volume of carrier fluid.

As utilized herein, the terms "detergent" and "dispersant" are indicative of compounds having the ability to solubilize elements or compounds that would result in the formation of deposits and/or undesirable compounds in fuel or in an engine and its components. Therein, the terms "detergent" and "dispersant" as used herein are understood to be interchangeable with respect to their roles in reducing deposits.

Various types of detergents singularly, or in combination, are suitable for use in the presently claimed invention, and the practice of this invention extends to all compounds suitable for improving the minimizing undesirable precipitation and deposit formation.

In general, the detergent/dispersants utilized pursuant to this invention are fuel-soluble detergent/dispersants including fuel-soluble salts, amides, imides, oxazolines and esters, or mixtures thereof of long chain aliphatic hydrocarbon-substituted dicarboxylic acids or their anhydrides; polyetheramines; long chain aliphatic hydrocarbons having an amine or a polyamine attached directly thereto; and Mannich condensation products formed by condensing a long chain aliphatic hydrocarbon-substituted phenol or cresol with an aldehyde, preferably formaldehyde, and a monoamine or a polyamine. In an embodiment, the long chain hydrocarbon group of a detergent/dispersant is a polymer of at least one $C_2$ to $C_{10}$ monoolefin, preferably at least one $C_2$ to $C_5$ monoolefin, and most preferably at least one $C_3$ to $C_4$ monoolefin, said polymer having a number average molecular weight of at least about 300, preferably at least about 400, and more preferably at least about 700. In another embodiment, the detergent/dispersant is preferably a succinimide of a hydrocarbyl polyamine or a polyoxyalkylene polyamine. Another embodiment includes a detergent/dispersant that is preferably a polyisobutenyl polyamine. An additional embodiment includes a detergent/dispersant that is preferably a condensation product of (1) a high molecular weight sulfur-free alkyl-substituted hydroxyaromatic compound wherein the alkyl group has a number average molecular weight of from about 600 to about 3000, more preferably in the range of about 750 to about 1200, (2) an amine, preferably a polyamine, which contains an amino group having at least one active hydrogen atom, and (3) an aldehyde, preferably formaldehyde or a formaldehyde-forming reagent or formaldehyde precursor such as a reversible polymer of formaldehyde, wherein the molar ratio of reactants (1): (2): (3) is 1:0.1-10:0.1-10. In another embodiment these polymers of monolefins may be normal polyalkanes or alkanes having a major portion of their double bonds in the alpha and/or beta position.

Monoamine. Polyamine and Polyetheramine Detergents

The detergent/dispersant has an aliphatic chain (saturated or olefinically unsaturated) which contains an average of at least about 20, preferably at least about 30, and more preferably at least about 50 carbon atoms to provide the fuel solubility and stability required to function effectively as a detergent/dispersant. The long chain aliphatic group of the detergent/dispersant is derived from a mixture of aliphatic hydrocarbons such as polypropenes, polybutenes, polyisobutenes, polyamylenes, etc. The polymers of monolefins may be normal polyalkanes or alkanes having a major portion of their double bonds in the alpha and/or beta position. The aliphatic chain of the detergent/dispersant is usually a hydrocarbyl group, but it may be a substituted hydrocarbyl group wherein the substituents are certain oxygen-based substituents such as ether oxygen linkages, keto groups (i.e., a carbonyl group bonded to two different carbon atoms), and/or hydroxyl groups.

The detergent/dispersants are typically formed from an aliphatic ammonia, monoamine or polyamine although in some cases useful products can be formed from aromatic polyamines. In this connection, the term "aliphatic polyamine" includes both open chain compounds (linear or branched) and ring compounds in which the ring is not aromatic in character. Thus the polyamine can be, for example an open chain polyamine such as diethylene triamine, tris(2-aminoethyl) amine, or hexamethylene diamine, or it can be a nonaromatic cyclic polyamine such as piperazine or N-(2-aminoethyl)piperazine. In addition, the polyamine can be a polyoxyalkylene polyamine such as are available commercially under the Jeffamine® trade designation.

Polyamines which may be employed in forming the detergent/dispersant include any that have at least one amino group having at least one active hydrogen atom. A few representative examples include branched-chain alkanes containing two or more primary amino groups such as tetramino-neopentane; polyaminoalkanols such as 2-(2-aminoethylamino)-ethanol and 2-[2-(2-aminoethylamino)-ethylamino]-ethanol; heterocyclic compounds containing two or more amino groups at least one of which is a primary amino group such as 1-(β-aminoethyl)-2-imidazolidone, 2-(2-aminoethylamino)-5-nitropyridine, 3-amino-N-ethylpiperidine, 2-(2-aminoethyl)-pyridine, 5-aminoindole, 3-amino-5-mercapto-1,2,4-triazole, and 4-(aminomethyl)-piperidine; and the alkylene polyamines such as propylene diamine, dipropylene triamine, di-(1,2-butylene)triamine, N-(2-aminoethyl)-1,3-propanediamine, hexamethylenediamine and tetra-(1,2-propylene)-pentamine.

Preferred amines are the alkylene polyamines, especially the ethylene polyamines which may be depicted by the formula:

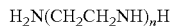

H$_2$N(CH$_2$CH$_2$NH)$_n$H wherein n is an integer from about one to about ten. These include: ethylene diamine, diethylene triamine, triethylene tetramine, tetraethylene pentamine, pentaethylene hexamine, and the like, including mixtures thereof in which case n is the average value of the mixture. Commercially available ethylene polyamine mixtures usually contain minor amounts of branched species and cyclic species such as N-aminoethyl piperazine, N,N'-bis(aminoethyl)piperazine, N,N'-bis(piperazinyl)ethane, and like compounds. Typical commercial mixtures have approximate overall compositions falling in the range corresponding to diethylene triamine to pentaethylene hexamine. Methods for the production of polyalkylene amines or polyamines are known and reported in the literature. See for example U.S. Pat. No. 4,827,037 and references cited therein, all disclosures of such patent and cited references being incorporated herein by reference.

Generally speaking, mixtures of alkylene polyamines such as propylene polyamines and ethylene polyamines suitable for forming the detergent/dispersants will typically contain an average of about 1 to about 10 and preferably an average of about 2 to about 7 nitrogen atoms per molecule. Accordingly, preferred polyamines used in the synthesis reaction for forming the detergent/dispersants for gasoline are preferably (1) diethylene triamine, (2) a combination of ethylene polyamines which approximates diethylene triamine in overall composition, (3) triethylene tetramine, (4) a combination of ethylene polyamines which approximates triethylene tetramine in overall composition, or (5) a combination of any two or three of, or of all four of (1), (2), (3) and (4). Ordinarily this reactant will comprise a commercially available mixture having the general overall composition approximating that of triethylene tetramine but which can contain minor amounts of branched-chain and cyclic species as well as some linear polyethylene polyamines such as diethylene triamine and tetraethylene pentamine. For best results, such mixtures should contain at least 50% and preferably at least 70% by weight of the linear polyethylene polyamines enriched in triethylene tetramine. In general, the ethylene polyamine mixtures known commercially as "diethylene triamine" will contain an average in the range of about 2.5 to about 3.5 nitrogen atoms per molecule. The commercially available ethylene polyamine mixtures known as "triethylene tetramines" will usually contain an average in the range of about 2 to about 4.5 nitrogen atoms per molecule.

Polyetheramines suitable for use as the detergents of the present invention are "single molecule" additives, incorporating both amine and polyether functionalities within the same molecule. The polyether backbone can in one embodiment herein be based on propylene oxide, ethylene oxide, butylene oxide, or mixtures of these. In another embodiment, propylene oxide or butylene oxide or mixtures thereof are used to impart good fuel solubility. The polyetheramines can be monoamines, diamines or triamines. The molecular weight of the polyetheramines will typically range from about 500 to about 3000. Other suitable polyetheramines are those compounds taught in U.S. Pat. Nos. 4,288,612; 5,089,029; and 5,112,364, incorporated herein by reference.

Succinimide Detergents

A preferred succinimide detergent/dispersant for is prepared by a process which comprises reacting (A) an ethylene polyamine selected from (1) diethylene triamine, (2) a combination of ethylene polyamines which approximates diethylene triamine in average overall composition, (3) triethylene tetramine, (4) a combination of ethylene polyamines which approximates triethylene tetramine in average overall composition, or (5) a mixture of any two or more of (1) through (4); with (B) at least one acyclic hydrocarbyl substituted succinic acylating agent. The substituent of such acylating agent is characterized by containing an average of about 50 to about 100 (preferably about 50 to about 90 and more preferably about 64 to about 80) carbon atoms. Additionally, the acylating agent has an acid number in the range of about 0.7 to about 1.3 (e.g., in the range of 0.9 to 1.3, or in the range of 0.7 to 1.1), more preferably in the range of about 0.8 to about 1.0 or in the range of about 1.0 to about 1.2, and most preferably about 0.9. The detergent/dispersant contains in its molecular structure in chemically combined form an average of from about 1.5 to about 2.2 (preferably from 1.7 to 1.9 or from 1.9 to 2.1, more preferably from 1.8 to 2.0, and most preferably about 1.8) moles of said acylating agent, (B), per mole of said polyamine, (A).

The acid number of the acyclic hydrocarbyl substituted succinic acylating agent is determined in the customary way (i.e., by titration) and is reported in terms of mg of KOH per gram of product. It is to be noted that this determination is made on the overall acylating agent with any unreacted olefin polymer (e.g., polyisobutene) present.

The acyclic hydrocarbyl substituent of the detergent/dispersant is preferably an alkyl or alkenyl group having the requisite number of carbon atoms as specified above. Alkenyl substituents derived from poly-α-olefin homopolymers or copolymers of appropriate molecular weight (e.g., propene homopolymers, butene homopolymers, $C_3$ and $C_4$ α-olefin copolymers, and the like) are suitable. Most preferably, the substituent is a polyisobutenyl group formed from polyisobutene having a number average molecular weight (as determined by gel permeation chromatography) in the range of about 700 to about 1200, preferably about 900 to about 1100, most preferably about 940 to about 1000. The established manufacturers of such polymeric materials are able to adequately identify the number average molecular weights of their own polymeric materials. Thus in the usual case the nominal number average molecular weight given by the manufacturer of the material can be relied upon with considerable confidence.

Acyclic hydrocarbyl-substituted succinic acid acylating agents and methods for their preparation and use in the formation of succinimide are well known to those skilled in the art and are extensively reported in the patent literature. See, for example, the following U.S. Pat. Nos.

| |
|---|
| 3,018,247 |
| 3,018,250 |
| 3,018,291 |
| 3,172,892 |
| 3,184,474 |
| 3,185,704 |
| 3,194,812 |
| 3,194,814 |
| 3,202,678 |
| 3,215,707 |
| 3,219,666 |
| 3,231,587 |
| 3,272,746 |
| 3,287,271 |
| 3,311,558 |
| 3,331,776 |
| 3,341,542 |
| 3,346,354 |
| 3,347,645 |
| 3,361,673 |
| 3,373,111 |
| 3,381,022 |
| 3,399,141 |
| 3,401,118 |
| 3,513,093 |
| 3,576,743 |
| 3,578,422 |
| 3,658,494 |
| 3,658,495 |
| 3,912,764 |
| 4,110,349 |
| 4,234,435 |
| 5,071,919 |

When utilizing the general procedures such as described in these patents, the important considerations insofar as the present invention is concerned, are to insure that the hydrocarbyl substituent of the acylating agent contain the requisite number of carbon atoms, that the acylating agent have the requisite acid number, that the acylating agent be reacted with the requisite polyethylene polyamine, and that the reactants be employed in proportions such that the resultant succinimide contains the requisite proportions of the chemically combined reactants, all as specified herein. When utilizing this combination of features, detergent/dispersants are formed which possess exceptional effectiveness in controlling or reducing the amount of induction system deposits formed during engine operation and which permit adequate demulsification performance.

As pointed out in the above listed patents, the acyclic hydrocarbyl-substituted succinic acylating agents include the hydrocarbyl-substituted succinic acids, the hydrocarbyl-substituted succinic anhydrides, the hydrocarbyl-substituted succinic acid halides (especially the acid fluorides and acid chlorides), and the esters of the hydrocarbyl-substituted succinic acids and lower alcohols (e.g., those containing up to 7 carbon atoms), that is, hydrocarbyl-substituted compounds which can function as carboxylic acylating agents. Of these compounds, the hydrocarbyl-substituted succinic acids and the hydrocarbyl-substituted succinic anhydrides and mixtures of such acids and anhydrides are generally preferred, the hydrocarbyl-substituted succinic anhydrides being particularly preferred.

The acylating agent for producing the detergent/dispersants is preferably made by reacting a polyolefin of appropriate molecular weight (with or without chlorine) with maleic anhydride. However, similar carboxylic reactants can be employed such as maleic acid, fumaric acid, malic acid, tartaric acid, itaconic acid, itaconic anhydride, citraconic acid, citraconic anhydride, mesaconic acid, ethylmaleic anhydride, dimethylmaleic anhydride, ethylmaleic acid, dimethylmaleic acid, hexylmaleic acid, and the like, including the corresponding acid halides and lower aliphatic esters.

The reaction between the polyamine and the acylating agent is generally conducted at temperatures of about 80° C. to about 200° C., more preferably about 140° C. to about 180° C., such that a succinimide is formed. These reactions may be conducted in the presence or absence of an ancillary diluent or liquid reaction medium, such as a mineral lubricating oil solvent. If the reaction is conducted in the absence of an ancillary solvent, such is usually added to the reaction product on completion of the reaction. In this way, the final product is more readily handled, stored and blended with other components. Suitable solvent oils include natural and synthetic base oils having a viscosity (ASTM D 445) of preferably about 3 to about 12 $mm^2/sec$ at 100° C. with the primarily paraffinic mineral oils such as a 500 Solvent Neutral oil being particularly preferred.

As used herein, the term "succinimide" is meant to encompass the completed reaction product from the polyamine and the acylating agent, and is intended to encompass compounds wherein the product may have amide, amidine, and/or salt linkages in addition to the imide linkage of the type that results from the reaction of a primary amino group and an anhydride moiety.

Aliphatic Monoamines and Aliphatic Polyamines

These detergent/dispersants are known materials prepared by known process technology. One common process involves halogenation of a long chain aliphatic hydrocarbon such as a polymer of ethylene, propylene, butylene, isobutene, amylene, or copolymers such as ethylene and propylene, butylene and isobutylene, and the like, followed by reaction of the resultant halogenated hydrocarbon with a polyamine. If desired, at least some of the product can be converted into an amine salt by treatment with an appropriate quantity of an acid. The products formed by the halogenation route often contain a small amount of residual halogen such as chlorine. Another way of producing suitable aliphatic polyamines involves controlled oxidation (e.g., with air or a peroxide) of a polyolefin such as polyisobutene followed by reaction of the oxidized polyolefin with a polyamine such as ethylenediamine, diethylene triamine, triethylenetramine, tetraethylenepentimine, N,N-dimethylpropylenediamine. For synthesis details for preparing such aliphatic polyamine detergent/dispersants, see, for example U.S. Pat. Nos. 3,438,757; 3,454,555; 3,485,601; 3,565,804; 3,573,010; 3,574,576; 3,671,511; 3,746,520; 3,756,793; 3,844,958; 3,852,258; 3,864,098; 3,876,704; 3,884,647; 3,898,056; 3,950,426; 3,960,515; 4,022,589; 4,039,300; 4,128,403; 4,166,726; 4,168,242; 5,034,471; 5,086,115; 5,112,364; and 5,124,484; and published European Patent Application 384,086. The disclosures of each of the foregoing documents are incorporated herein by reference, as the additives therein described are deemed suitable for the practice of this invention. The long chain substituent(s) of the detergent/dispersant most preferably contain(s) an average of about 50 to about 350 carbon atoms in the form of alkyl or alkenyl groups (with or without a small residual amount of halogen substitution). Alkenyl substituents derived from poly-α-olefin homopolymers or copolymers of appropriate molecular weight (e.g., propene homopolymers, butene homopolymers, $C_3$ and $C_4$ α-olefin copolymers, and the like) are suitable. Most preferably polyalkkenemonoamines and polyalkenepolyamines are based on polypropene or on highly reactive polybutene or polyisobutylene (predominately having double bonds in the alpha- or beta-positions) the substituent is a polyisobutenyl group formed from polyisobutene having a number average molecular weight (as determined by gel permeation chromatography) in the range of about 500 to about 2000, preferably about 600 to about 1800, most preferably about 700 to about 1600. The established manufacturers of such polymeric materials are able to adequately identify the number average molecular weights of their own polymeric materials. Thus in the usual case the nominal number average molecular weight given by the manufacturer of the material can be relied upon with considerable confidence.

Besides preparation via chlorination, polyalkkenemonoamines and polyalkenepolyamines can also be prepared by hydroformylation and reductive amination with ammonia, monoamines and polyamines.

Mannich Detergents

The Mannich base detergents useful in embodiments of the present invention are the reaction products of an alkyl-substituted hydroxy aromatic compound, aldehydes and amines. The alkyl-substituted hydroxyaromatic compound, aldehydes and amines used in making the Mannich reaction products of the present invention may be any such compounds known and applied in the art, in accordance with the foregoing limitations. It is of course understood that if desired, that the Mannich components and/or reaction products can be post-treated with various post-treating agents. Technology of this type is well known and extensively reported in the literature.

Representative alkyl-substituted hydroxyaromatic compounds that may be used in forming the present Mannich base products are polypropylphenol (formed by alkylating phenol with polypropylene), polybutylphenols (formed by alkylating phenol with polybutenes and/or polyisobutylene), polybutyl-co-polypropylphenols (formed by alkylating phenol with a copolymer of butylene and/or butylene and propylene) and their alkylcresol equivalents. Other similar long-chain alkylphenols may also be used. Examples include phenols alkylated with copolymers of butylene and/or isobutylene and/or propylene, and one or more mono-olefinic comonomers copolymerizable therewith (e.g., ethylene, 1-pentene, 1-hexene, 1-octene, 1-decene, etc.) where the copolymer molecule contains at least about 50% by weight, of butylene and/or isobutylene and/or propylene units. The comonomers polymerized with propylene or such butenes may be aliphatic and can also contain non-aliphatic groups, e.g., styrene, o-methylstyrene, p-methylstyrene, divinyl benzene and the like. Thus in any case the resulting polymers and copolymers used in forming the alkyl-substituted hydroxyaromatic compounds are substantially aliphatic hydrocarbon polymers.

In one embodiment herein, polybutylphenol (formed by alkylating phenol with polybutylene) is used in forming the Mannich base detergent. Unless otherwise specified herein, the term "polybutylene" is used in a generic sense to include polymers made from "pure" or "substantially pure" 1-butene or isobutene, and polymers made from mixtures of two or all three of 1-butene, 2-butene and isobutene. Commercial grades of such polymers may also contain insignificant amounts of other olefins. So-called high reactivity polybutylenes having relatively high proportions of polymer molecules having a terminal vinylidene group, formed by methods such as described, for example, in U.S. Pat. No. 4,152,499 and W. German Offenlegungsschrift 29 04 314, are also suitable for use in forming the long chain alkylated phenol reactant.

The alkylation of the hydroxyaromatic compound is typically performed in the presence of an alkylating catalyst at a temperature in the range of about 50 to about 200° C. Acidic catalysts are generally used to promote Friedel-Crafts alkylation. Typical catalysts used in commercial production include sulphuric acid, $BF_3$, aluminum phenoxide, methanesulphonic acid, cationic exchange resin, acidic clays and modified zeolites.

The long chain alkyl substituents on the benzene ring of the phenolic compound are derived from polyolefin having a number average molecular weight (MW of from about 500 to about 3000 (preferably from about 500 to about 2100) as determined by gel permeation chromatography (GPC). It is also preferred that the polyolefin used have a polydispersity (weight average molecular weight/number average molecular weight) in the range of about 1 to about 4 (preferably from about 1 to about 2) as determined by GPC.

The chromatographic conditions for the GPC method referred to throughout the specification are as follows: 20 microliters of sample having a concentration of approximately 5 mg/ml (polymer/unstabilized tetrahydrofuran solvent) is injected into 1000 A, 500 A and 100 A columns at a flow rate of 1.0 ml/min. The run time is 40 minutes. A Differential Refractive Index detector is used and calibration is relative to polyisobutene standards having a molecular weight range of 284 to 4080 Daltons.

The Mannich detergent may be made from a long chain alkylphenol. However, other phenolic compounds may be used including high molecular weight alkyl-substituted derivatives of cresol, resorcinol, hydroquinone, catechol, hydroxydiphenyl, benzylphenol, phenethylphenol, naphthol, tolylnaphthol, among others. Preferred for the preparation of the Mannich condensation products are the polyalkylphenol and polyalkylcresol reactants, e.g., polypropylphenol, polybutylphenol, polypropylcresol and polybutylcresol, wherein the alkyl group has a number average molecular weight of about 500 to about 2100, while the most preferred alkyl group is a polybutyl group derived from polybutylene having a number average molecular weight in the range of about 800 to about 1300.

The preferred configuration of the alkyl-substituted hydroxyaromatic compound is that of a para-substituted mono-alkylphenol or a para-substituted mono-alkyl ortho-cresol. However, any alkylphenol readily reactive in the Mannich condensation reaction may be employed. Thus, Mannich products made from alkylphenols having only one ring alkyl substituent, or two or more ring alkyl substituents are suitable for use in this invention. The long chain alkyl substituents may contain some residual unsaturation, but in general, are substantially saturated alkyl groups.

Representative amine reactants include, but are not limited to, linear, branched or cyclic alkylene monoamines or polyamines having at least one suitably reactive primary or secondary amino group in the molecule. Other substituents such as hydroxyl, cyano, amido, etc., can be present in the amine. In a preferred embodiment, the alkylene polyamine is a polyethylene polyamine. Suitable alkylene polyamine reactants include ethylenediamine, diethylenetriamine, triethylenetetramine, tetraethylenepentamine, pentaethylenehexamine, hexaethyleneheptamine, heptaethyleneoctamine, octaethylenenonamine, nonaethylenedecamine, decaethyleneundecamine and mixtures of such amines having nitrogen contents corresponding to alkylene polyamines of the formula $H_2N\text{-}(A\text{-}NH\text{---})_n H$, where A is divalent ethylene or propylene and n is an integer of from 1 to 10. The alkylene polyamines may be obtained by the reaction of ammonia and dihaloalkanes, such as dichloro alkanes. Thus, the alkylene polyamines obtained from the reaction of 2 to 11 moles of ammonia with 1 to 10 moles of dichloro alkanes having 2 to 6 carbon atoms and the chlorines on different carbon atoms are suitable alkylene polyamine reactants.

In another preferred embodiment of the present invention, the amine is an aliphatic linear, branched or cyclic diamine having one primary or secondary amino group and one tertiary amino group in the molecule. Examples of suitable polyamines include N,N,N'',N''-tetraalkyl-dialkylenetriamines (two terminal tertiary amino groups and one central secondary amino group), N,N,N',N''-tetraalkyltrialkylenetetramines (one terminal tertiary amino group, two internal tertiary amino groups and one terminal primary amino group), N,N,N',N'',N'''-pentaalkyltrialkylene-tetramines (one terminal tertiary amino group, two internal tertiary amino groups and one terminal secondary amino group), N,N-dihydroxyalkyl-alpha, omega-alkylenediamines (one terminal tertiary amino group and one terminal primary amino group), N,N,N'-trihydroxy-alkyl-alpha, omega-alkylenediamines (one terminal tertiary amino group and one terminal secondary amino group), tris(dialkylaminoalkyl)aminoalkylmethanes (three terminal tertiary amino groups and one terminal primary amino group), and like compounds, wherein the alkyl groups are the same or different and typically contain no more than about 12 carbon atoms each, and which preferably contain from about 1 to about 4 carbon atoms each. Preferably these alkyl groups are methyl and/or ethyl groups. Preferred polyamine reactants are N,N-dialkyl-alpha, omega-alkylenediamine, such as those having from about 3 to about 6 carbon atoms in the alkylene group and from about 1 to about 12 carbon atoms in each of the alkyl groups, which most preferably are the same but which can be different. Most preferred is N,N-dimethyl-1,3-propanediamine and N-methyl piperazine. Most preferred are dialkyl amines having alkyl groups from about 1 to about 6 carbon atoms. Examples of preferred dialkylamines are dimethylamine, diethylamine, dipropylamine, dibutylamine, dipentylamine, dihexylamine and mixed alkylamines such as methylethylamine and ethyl pentyl amine Examples of polyamines having one reactive primary or secondary amino group that can participate in the Mannich condensation reaction, and at least one sterically hindered amino group that cannot participate directly in the Mannich condensation reaction to any appreciable extent include N-(tert-butyl)-1,3-propanediamine, N-neopentyl-1,3-propanediamine, N-(tert-butyl)-1-methyl-1,2-ethanediamine, N-(tert-butyl)-1-methyl-1,3-propanediamine, and 3,5-di(tert-butyl) aminoethy-1-piperazine.

Representative aldehydes for use in the preparation of the Mannich base products include the aliphatic aldehydes such as formaldehyde, acetaldehyde, propionaldehyde, butyraldehyde, valeraldehyde, caproaldehyde, heptaldehyde, stearaldehyde. Aromatic aldehydes which may be used include benzaldehyde and salicylaldehyde. Illustrative heterocyclic aldehydes for use herein are furfural and thiophene aldehyde, etc. Also useful are formaldehyde-producing reagents such as paraformaldehyde, or aqueous formaldehyde solutions such as formalin. Most preferred is formaldehyde or formalin.

The condensation reaction among the alkylphenol, the specified amine(s) and the aldehyde may be conducted at a temperature in the range of about 40° to about 200° C. The reaction can be conducted in bulk (no diluent or solvent) or in a solvent or diluent. Water is evolved and can be removed by azeotropic distillation during the course of the reaction. Typically, the Mannich reaction products are formed by reacting the alkyl-substituted hydroxyaromatic compound, the amine and aldehyde in the molar ratio of 1.0:0.5-2.0:1.0-3.0, respectively.

Suitable Mannich base detergents for use in the present invention include those detergents taught in U.S. Pat. Nos. 4,231,759; 5,514,190; 5,634,951; 5,697,988; 5,725,612; and 5,876,468, the disclosures of which are incorporated herein by reference.

When formulating the fuel compositions of this invention, the Mannich base detergent (with our without other detergents and additives) is employed in amounts sufficient to reduce or eliminate deposits. Thus the fuels will contain minor amounts of the Mannich base detergent so as to prevent or reduce formation of engine deposits or remove existing engine deposits, and particularly intake valve deposits. Generally speaking the fuel compositions of this invention will contain on an active ingredient basis an amount of Mannich base detergent in the range of about 2 to about 150 ptb (pounds by weight of additive per thousand barrels by volume of fuel), and preferably in the range of about 5 to about 80 ptb.

Base Fuel

The base fuels used in formulating the fuel compositions of the present invention include any base fuels suitable for use in the operation of spark-ignition internal combustion engines such as leaded or unleaded motor and aviation gasolines, and so-called reformulated gasolines which typically contain both hydrocarbons of the gasoline boiling range and fuel-soluble oxygenated blending agents ("oxygenates"), such as alcohols, ethers and other suitable oxygen-containing organic compounds. Preferably, the fuel in which the inventive additive is employed is a mixture of hydrocarbons boiling in the gasoline boiling range. This fuel may consist of straight chain or branch chain paraffins, cycloparaffins, olefins, aromatic hydrocarbons or any mixture of these. The gasoline can be derived from straight run naptha, polymer gasoline, natural gasoline, catalytically cracked gasoline, alkylate or from catalytically reformed stocks and other refinery or chemical stocks boiling in the range from about 80° to about 450° F. The octane level of the gasoline is not critical and any conventional gasoline may be employed in the practice of this invention.

Oxygenates suitable for use in the present invention include, but are not limited to methanol, ethanol, n-propanol, isopropanol, n-butanol, isobutanol, t-butanol, mixed C1 to C5 alcohols, methyl tertiary butyl ether, tertiary amyl methyl-ether, ethyl tertiary butyl ether and mixed ethers. Oxygenates, when used, will normally be present in the base fuel in an amount below about 30% by volume, and preferably in an amount that provides an oxygen content in the overall fuel in the range of about 0.5 to about 5 percent by volume.

Other fuels known as alternative fuels may also be used. These fuels will include fuels such as 100% ethanol, hydrated ethanol, 70%-85% ethanol known as "E85."

In an embodiment, a hydrocarbonaceous fuel utilized in the presently claimed invention may be selected from one or more fuel substrates including oils for bunker, marine, utility boilers, furnaces, industrial burners boilers, and waste oils and liquid chemicals for incinerator start-up and/or combustion balancing; synthetic fuels such as gas to liquid (GTL), biomass to liquid (BTL), and coal to liquid (CTL); oil shale derived fuels; diesel fuel; biodiesel fuel; biodiesel-derived fuel; biobutanol; alcohols; ethers; low sulfur fuel; synthetic fuel; Fischer-Tropsch fuel; liquid petroleum gas; fuels derived from coal; genetically engineered biofuels, crops, and extracts therefrom; natural gas; propane; butane; unleaded motor and aviation gasolines; reformulated gasolines which contain both hydrocarbons of the gasoline boiling range and fuel-soluble oxygenated blending agents; and gasoline.

Optional Additives

The fuel compositions of the present invention may contain supplemental additives in conjunction with the detergent(s) described above. Said supplemental additives include additional dispersants/detergents, antioxidants, carrier fluids, metal deactivators, dyes, markers, corrosion inhibitors, biocides, antistatic additives, drag reducing agents, demulsifiers, dehazers, anti-icing additives, antiknock additives, anti-valve-seat recession additives, lubricity additives, friction improving additives, fuel economy additives, combustion improvers and other similar additives along with other additives found in gasoline or that may carry over from processing, storing or distributing the fuel.

The additives used in formulating the preferred fuels of the present invention can be blended into the base fuel individually or in various sub-combinations. However, it is preferable to blend all of the components concurrently using an additive concentrate as this takes advantage of the mutual compatibility afforded by the combination of ingredients when in the form of an additive concentrate. Also use of a concentrate reduces blending time and lessens the possibility of blending errors.

Other aspects of the present invention include fuels for spark-ignition engines into which have been blended small amounts of the various compositions of the invention described herein, as well as methods for reducing or minimizing injector and combustion chamber deposits by fueling and/or operating the engine with the fuel composition of this invention.

Proportions

In an embodiment, the proportion of detergent to mineral oil carrier fluid contemplated in an embodiment herein would range from about 0.1 to 1.0 to about 1.0 to 0.10. Additional embodiments may include mineral oils combined with ancillary carrier fluids and/or detergents; however, the proportion of detergent to total carrier fluid would range from about 0.25 to about 1.0 to about 1.0 to about 0.25. In an embodiment the proportion of liquid carrier used relative to the detergent and/or dispersant is such that the fuel composition when consumed in the engine results in improved intake valve cleanliness, when compared to an engine operated using the same composition except for being devoid of the liquid carrier. Thus, in general, the weight ratio of carrier fluid to detergent/dispersant on an active ingredient basis, i.e., excluding solvent(s), if any, used in the manufacture of the detergent/dispersant either during or after its formation—but before the addition of the carrier fluid—will usually fall within the range of about 0.5 to about 1.0 to about 1.0 to about 0.25. In addition to relative proportions, the terms "weight percent" (wt %) or "percent" may also be used to indicate the relative fractional contribution by weight of a component in a composition, such that the sum of relative percentages of all components totals 100%.

In an embodiment, an additive concentrate of the presently claimed invention will contain from about 10% to about 75%, and preferably from about 10% to about 50%, of the detergent/dispersant on an active ingredient basis. Generally speaking, the fuels of the presently claimed invention will contain on an active ingredient basis as defined above, an amount of the detergent/dispersant in the range of about 2.5 to about 500 ptb (pounds by weight of additive per thousand barrels by volume of fuel), and preferably in the range of about 5 to about 250 ptb.

In another embodiment, the fuel compositions will comprise a total amount of carrier fluid in an amount from about 0.25 to about 6, and preferably from about 0.5 to about 3, per part by weight of detergent/dispersant (on an active ingredient basis).

EXAMPLES

The practice and advantages of this invention are demonstrated by the following examples, which are presented for purposes of illustration and not limitation. Unless indicated otherwise, all amounts, percentages, and ratios are by weight.

In the first example (Table 1), five test samples were prepared in which the base fuel (Colonial Pipeline "P/L" fuel) was tested alone, and with four combinations of detergents and carriers. Measurements of intake valve deposit formation were obtained utilizing the ASTM D-6201 test. This test evaluates intake valve deposit formation of unleaded spark-ignition engine fuels utilizing a Ford 2.3 in-line, four cylinder engine.

Three carriers were tested to demonstrate the improved benefits of the presently claimed invention. Comparisons were made between a prior art mineral oil carrier (500 N), which is not within the scope of the presently claimed invention, and two hydrocarbon oil carriers within the scope of the presently claimed invention (P1810, and PL60 available from PetroCanada) and two detergent chemistries. The weight ratio of detergent to carrier was 1:1, and the properties of the base fuel, Colonial Pipeline "P/L" Fuel, are described below. A fourth carrier within the scope of the presently claimed invention (Yubase 4) is utilized in the second example (Table 2), and its properties are also summarized below.

Properties of Carriers Tested:

| Carrier | Vis (20° C.) | Vis (40° C.) | Vis (100° C.) | Pour Point (° C.) | Sulfur (ppm) | Saturated Hydrocarbons |
|---------|-------------|-------------|--------------|-------------------|--------------|------------------------|
| 500 N   | 302         | 89.9        | 10.3         | −6.7              | 5000         | 61.9                   |
| P1810   | 99.5        | 35.6        | 5.7          | −18               | <10          | 99.9                   |
| PL60    | 21.45       | 10.25       | 2.64         | −24               | <10          | 99.9                   |
| Yubase 4| 43.4        | 19.1        | 4.2          | −15               | <1 ppm       | >90                    |

Properties of Tested Fuel (Colonial Pipeline "P/L" Fuel):

| Test Description | Final Result | ASTM Test Method |
|---|---|---|
| API Gravity (@ 60° F.) | 60.6 | D-4052 |
| Distillation, Gasoline (° F.) | | D-86 |
| Initial Boiling Point | 84.9 | |
| 05% Evaporated Temperature | 100.1 | |
| 10% Evaporated Temperature | 113.3 | |
| 20% Evaporated Temperature | 133.4 | |
| 30% Evaporated Temperature | 155.1 | |
| 40% Evaporated Temperature | 180.5 | |
| 50% Evaporated Temperature | 207.1 | |
| 60% Evaporated Temperature | 233.0 | |
| 70% Evaporated Temperature | 259.9 | |
| 80% Evaporated Temperature | 293.5 | |
| 90% Evaporated Temperature | 339.0 | |
| 95% Evaporated Temperature | 372.5 | |
| Final Boiling Point | 437.5 | |
| Recovery (Vol %) | 95.8 | |
| Residue (Vol %) | 1.2 | |
| Loss (Vol %) | 3.0 | |
| Hydrocarbon Type - FIA | | |
| Aromatics (LV %) | 26.0 | D1319 |
| Olefins (LV %) | 12.6 | |
| Saturates (LV %) | 61.4 | |

Fuel Analytical Report:

| Test Description | Final Result | ASTM Test Method |
|---|---|---|
| Induction Period (min) | 960+ | D-525 |
| Octane | | |
| Research Octane | 91.5 | D-2699 |
| Motor Octane | 82.6 | D-2700 |
| R + M/2 | 87.0 | |

TABLE 1

DEPOSIT FORMATION MEASUREMENTS
(ASTM D-6201, Ford 2.3 liter engine)

| Base Fuel | Detergent | Carrier | Ratio | Avg. IVD (mg/valve) | Avg. CCD (mg/cylinder) |
|---|---|---|---|---|---|
| Colonial P/L (A) | None | None | None | 415.6 | 1298 |
| Colonial P/L (A) | Mannich | 500 N (1) | 1/1 | 213.7 | 1361 |
| Colonial P/L (A) | Mannich | P1810 (2) | 1/1 | 154.9 | 1303 |
| Colonial P/L (A) | Mannich | PL60 (2) | 1/1 | 155.7 | 1227 |
| Colonial P/L (A) | PIB Amine | P1810 (2) | 1/1 | 199.6 | 1414 |

(1) prior art mineral oil carrier
(2) hydrocarbon oil carrier within the scope of the presently claimed invention As demonstrated in Table 1, the accumulation of intake valve deposits (IVD) and combustion chamber deposits (CCD) is reduced upon utilization of carriers within the scope of the presently claimed invention.

In a second example, two hydrocarbon oils (Yubase 4 available from SK Corporation, Korea; and P1810) within the scope of the presently claimed invention were utilized in combination with a synthetic polybutene ancillary carrier fluid and a Mannich detergent. These combinations were in a ratio of 1 part Mannich detergent to 0.4 parts of the carrier of the presently claimed invention, and 0.4 parts of a synthetic ancillary co-carrier. These additive combinations were tested using ASTM Method D6201 with a different batch of Colonial pipeline regular unleaded gasoline.

TABLE 2

DEPOSIT FORMATION MEASUREMENTS
(ASTM D-6201, Ford 2.3 liter engine)

| Base Fuel | Detergent | Carrier of Invention | Co-carrier | Ratio | Avg. IVD (mg/valve) |
|---|---|---|---|---|---|
| Colonial P/L (B) | None | None | None | NA | 343.9 |
| Colonial P/L (B) | Mannich | P1810 | Polybutene | 1:0.4:0.4 | 52.8 |
| Colonial P/L (B) | Mannich | Yubase 4 | Polybutene | 1:0.4:0.4 | 52.9 |

Again, the utilization of carriers and detergents as described in embodiments herein, yielded improved results relative to measurements obtained using a base fuel alone.

In a third example, the Yubase 4 hydrocarbon oil was tested in combination with a succinimide detergent in low sulfur diesel fuel in the CEC PF 26 Injector Nozzle Coking Test. In this test the detergent properties of diesel fuels are determined using engine bench test with a naturally aspirated engine Peugeot XUD-9 (4 cylinders, 1.9 liter swept volume) diesel engine. Each test started with a set of new injection nozzles. After the test the degree of injector clogging (coking index, or injector flow remaining) at individual needle strokes (degree of opening of injector, measured in mm) is calculated as arithmetic average of coking index at three measurements. The test results (total coking index, or total flow remaining) are calculated as arithmetic average of coking indices value for the four injectors. The overall magnitude of injector clogging is demonstrated by the relative amounts of flow at the degree of opening of the injectors as provided below.

TABLE 3

INJECTOR NOZZLE CLOGGING RESULTS
(CEC PF 26 Injector Nozzle Coking Test, Peugeot XUD-9 diesel engine)

| Detergent | Hydrocarbon Oil | Treat Rate (mg/kg fuel) | Flow Remaining @ 0.1 mm | Flow Remaining @ 0.3 mm |
|---|---|---|---|---|
| None | None | 0/0 | 8.0 | 14.7 |
| Succinimide | Yubase 4 | 24.9/5.1 | 22.5 | 35.3 |
| Succinimide | Yubase 4 | 49.8/10.2 | 37 | 49.2 |
| Succinimide | Yubase 4 | 74.7/15.3 | 46.3 | 63.6 |
| Succinimide | Yubase 4 | 27.3/2.7 | 24.4 | 36.7 |
| Succinimide | Yubase 4 | 54.6/5.4 | 35.7 | 49.6 |
| Succinimide | Yubase 4 | 81.9/8.1 | 45.3 | 62.9 |

Thus, the flow remaining in the injectors is desirably greater upon incorporation of a detergent and carrier combination as described herein.

It is to be understood that the reactants and components referred to by chemical name anywhere in the specification or claims hereof, whether referred to in the singular or plural, are identified as they exist prior to coming into contact with another substance referred to by chemical name or chemical type (e.g., base fuel, solvent, etc.). It matters not what chemical changes, transformations and/or reactions, if any, take place in the resulting mixture or solution or reaction medium as such changes, transformations and/or reactions are the natural result of bringing the specified reactants and/or components together under the conditions called for pursuant to this disclosure. Thus the reactants and components are identified as ingredients to be brought together either in performing a desired chemical reaction (such as a Mannich condensation reaction) or in forming a desired composition (such as an additive concentrate or additized fuel blend).

It will also be recognized that the additive components can be added or blended into or with the base fuels individually per se and/or as components used in forming preformed additive combinations and/or sub-combinations. Accordingly, even though the claims hereinafter may refer to substances, components and/or ingredients in the present tense ("comprises", "is", etc.), the reference is to the substance, components or ingredient as it existed at the time just before it was first blended or mixed with one or more other substances, components and/or ingredients in accordance with the present disclosure. The fact that the substance, components or ingredient may have lost its original identity through a chemical reaction or transformation during the course of such blending or mixing operations is thus wholly immaterial for an accurate understanding and appreciation of this disclosure and the claims thereof.

As used herein the term "fuel-soluble" or "gasoline-soluble" means that the substance under discussion should be sufficiently soluble at 20° C. in the base fuel selected for use to reach at least the minimum concentration required to enable the substance to serve its intended function. Preferably, the substance will have a substantially greater solubility in the base fuel than this. However, the substance need not dissolve in the base fuel in all proportions.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

At numerous places throughout this specification, reference has been made to a number of U.S. patents, published foreign patent applications and published technical papers. All such cited documents are expressly incorporated in full into this disclosure as if fully set forth herein.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a", "an," and "the," include plural referents unless expressly and unequivocally limited to one referent. Thus, for example, reference to "an antioxidant" includes one or more different antioxidants. As used herein, the term "include" and its grammatical variants are intended to be non-limiting, such that recitation of items in a list is not to the exclusion of other like items that can be substituted or added to the listed items.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

Applicant does not intend to dedicate any disclosed embodiments to the public, and to the extent any disclosed modifications or alterations may not literally fall within the scope of the claims, they are considered to be part of the invention under the doctrine of equivalents.

We claim:

1. A fuel additive composition comprising:
    about 10 percent to about 75 percent of a Mannich detergent; and
    at least one liquid hydrocarbon carrier for the Mannich detergent, the liquid hydrocarbon carrier having a sulfur level less than about 50 ppm and a saturated hydrocarbon concentration of greater than about 75% wherein the liquid hydrocarbon carrier has a viscosity of about 10 to about 35 cSt at 40° C., wherein the liquid hydrocarbon carrier has a pour point at or below 0° C.; and
    at least one co-carrier selected from the group consisting of liquid poly-alpha-olefin oligomers, liquid poly(oxyalkylene) compounds, liquid alcohols, and liquid polyols.

2. The fuel additive composition of claim 1, wherein the detergent has a molecular weight of about 500 to about 5000.

3. The fuel additive composition of claim 1, wherein the liquid hydrocarbon carrier has a saturated hydrocarbon concentration of greater than about 90%.

4. The fuel additive composition of claim 1, wherein the detergent and liquid hydrocarbon carrier are combined at a ratio from about 0.25 to about 1 to about 1 to about 0.25.

5. A fuel composition comprising:
    a fuel;
    a Mannich detergent;
    at least one liquid hydrocarbon carrier for the Mannich detergent, the liquid hydrocarbon carrier having a sulfur level less than about 50 ppm and a saturated hydrocarbon concentration of greater than about 75% wherein the liquid hydrocarbon carrier has a viscosity of about 10 to about 35 cSt at 40° C. and wherein the liquid hydrocarbon carrier has a pour point at or below 0°; and
    at least one co-carrier selected from the group consisting of liquid poly-alpha-olefin oligomers, liquid poly(oxyalkylene) compounds, liquid alcohols, and liquid polyols.

6. The fuel composition of claim 5, wherein the detergent is present in the fuel in amounts ranging from about 10 to about 500 PTB.

7. The fuel composition of claim 5, wherein the liquid hydrocarbon carrier is present in the fuel in amounts ranging from about 0.25 to about 6 parts by weight per part by weight of detergent on an active ingredient basis.

8. The fuel composition of claim 5, further comprising at least one additive selected from the group consisting of antioxidants, carrier fluids, metal deactivators, dyes, markers, corrosion inhibitors, biocides, antistatic additives, drag reducing agents, demulsifiers, dehazers, anti-icing additives, antiknock additives, anti-valve-seat recession additives, lubricity additives, friction improving additives, and combustion improvers.

9. A method of reducing deposit formation in a spark ignition internal combustion engine comprising providing as fuel for the operation of said engine and operating said engine, a fuel composition in accordance with claim 5.

10. A method of reducing deposit formation in a spark ignition internal combustion engine comprising providing as fuel for the operation of said engine and operating said engine, a fuel containing the fuel additive composition in accordance with claim 1.

11. A method of reducing deposits in a direct injection gasoline engine, said method comprising providing to the engine a fuel composition comprising a fuel, a Mannich detergent, and at least one liquid hydrocarbon carrier having a sulfur level less than about 50 ppm and a saturated hydrocarbon concentration of greater than about 75% wherein the liquid hydrocarbon carrier has a viscosity of about 10 to about 35 cSt at 40° C. and wherein the liquid hydrocarbon carrier has a pour point at or below 0° C.

12. A method of operating a direct injection gasoline engine using an unleaded fuel composition which comprises introducing into a direct injection gasoline engine with the combustion intake charge a fuel composition comprising:

a spark ignition fuel;
a Mannich detergent; and
at least one liquid hydrocarbon carrier having a sulfur level less than about 50 ppm and a saturated hydrocarbon concentration of greater than about 75% wherein the liquid hydrocarbon carrier has a viscosity of about 10 to about 35 cSt at 40° C. and wherein the liquid hydrocarbon carrier has a pour point at or below 0° C.

13. The method of claim 12, wherein the spark-ignition fuel comprises gasoline.

* * * * *